Nov. 3, 1964   D. R. PERSSON   3,155,923
WAVEGUIDE CHOKE COUPLING HAVING FACE OF JOINT INTERRUPTED
BY ORTHOGONALLY INTERSECTING CHOKE GROOVES TO REDUCE
UNWANTED MODE RESONANCE
Filed Aug. 18, 1960   3 Sheets-Sheet 1
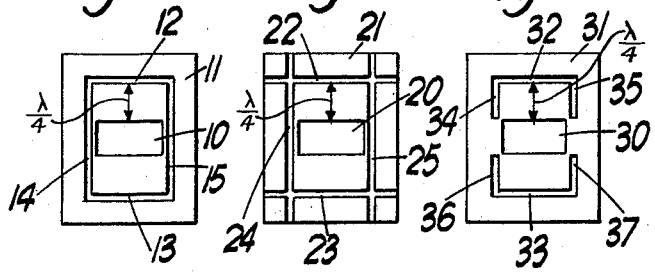
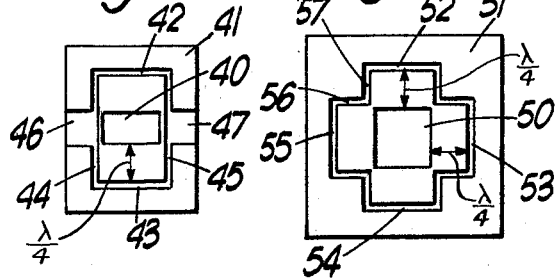
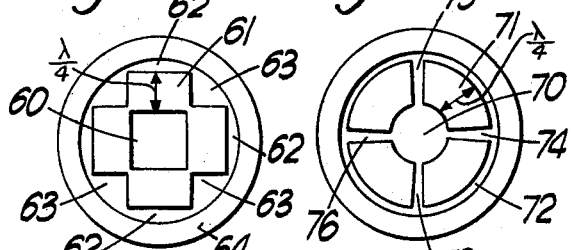
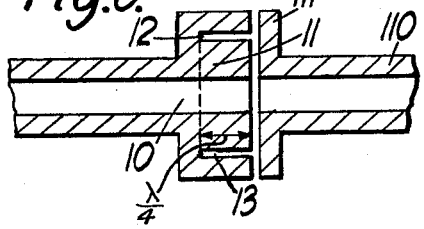
INVENTOR
DAVID ROBERT PERSSON
BY Mawhinney & Mawhinney
ATTYS.

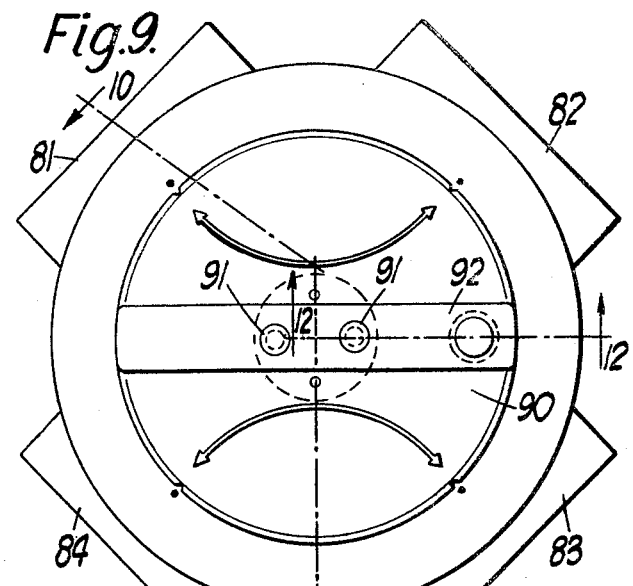
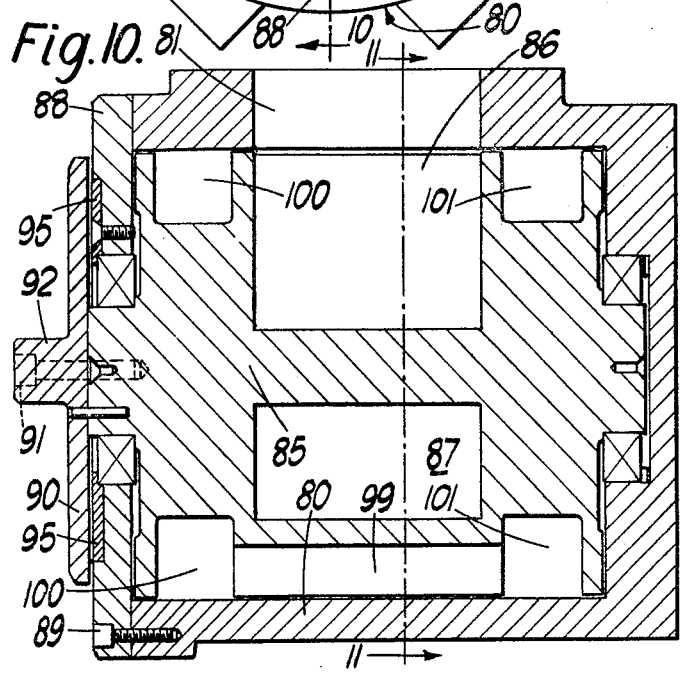

Nov. 3, 1964  D. R. PERSSON  3,155,923
WAVEGUIDE CHOKE COUPLING HAVING FACE OF JOINT INTERRUPTED
BY ORTHOGONALLY INTERSECTING CHOKE GROOVES TO REDUCE
UNWANTED MODE RESONANCE
Filed Aug. 18, 1960  3 Sheets-Sheet 3
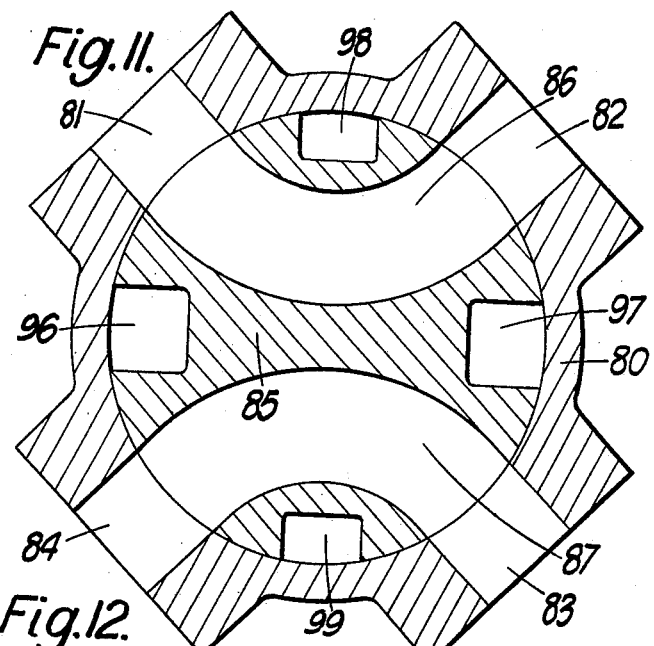
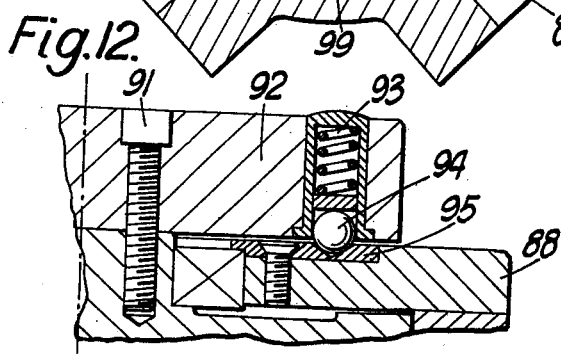
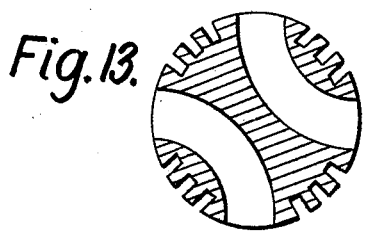
INVENTOR.
DAVID ROBERT PERSSON
BY Mawhinney & Mawhinney
ATTYS.

United States Patent Office 3,155,923
Patented Nov. 3, 1964

3,155,923
WAVEGUIDE CHOKE COUPLING HAVING FACE OF JOINT INTERRUPTED BY ORTHOGONALLY INTERSECTING CHOKE GROOVES TO REDUCE UNWANTED MODE RESONANCE
David Robert Persson, London, England, assignor to Decca Limited, London, England
Filed Aug. 18, 1960, Ser. No. 50,402
Claims priority, application Great Britain, Aug. 19, 1959, 28,399
15 Claims. (Cl. 333—7)

This invention relates to the coupling of waveguides.

Mating flanges on the ends of two waveguide sections inevitably have a small gap and the radiation into the gap results in loss of power transmitted through the waveguide connection. In some cases where the waveguides are permanently coupled it may be possible to make this gap small but often, for example in switches where one section of waveguide is mechanically moved into and out of alignment with another section of waveguide, physical contact between the flanges is not possible and the gap cannot be eliminated. It is well known to improve the electrical contact between the wageguides and to reduce the leakage through the gap by means of one or more choking grooves cut in one of the flanges to form a resonant choking structure. It is an object of the present invention to provide an improved form of waveguide coupling using such a choking system.

According to this invention, in a coupling between two waveguide sections, which sections have surfaces extending outwardly from the waveguide apertures, the two surfaces being adjacent to one another with a narrow gap and having at least one choking groove or recess in one or both of the surfaces to form a choking system, further grooves or recesses are arranged in one or each of the surfaces extending from said choking groove to points on or near the edge of the waveguide aperture to form side boundaries for the region or regions forming the leakage path between th waveguide aperture and the choking groove. The narrow gap between the surfaces may be envisaged as forming a transmission line supporting in general a number of propagating and evanescent modes, this transmission line extending from the edge of the waveguide aperture to the choking groove and the further grooves or recesses described above may be considered as forming side boundaries for this transmission line or as dividing it into a number of effectively independent transmission lines. With suitable spacing of such further grooves or recesses, these separate transmission lines are equivalent to simple parallel plate or radial transmission lines and the design and location of the choking groove or grooves are simplified and their effectiveness increased.

The aforementioned further grooves or recesses, as indicated above, have to provide an electrical boundary to the transmission line constituted by the gap between the surfaces and they may be made, for example, as grooves a quarter wavelength deep at the frequency of operation.

Preferably said further grooves or recesses meet or intersect the choking groove at right angles or at least have an edge forming the boundary to the aforementioned transmission line meeting or intersecting the choking groove at right angles. Most conveniently said further grooves are straight and these further grooves together with the choking groove and the edge to the waveguide thus form a four-sided figure.

Considering the case of a rectangular waveguide transmitting signals in an $H_{01}$ mode, preferably the choking grooves are arranged as two grooves parallel to the longer edges of the waveguide aperture and spaced away from the respective longer edges of the waveguide by a quarter wavelength at the operating frequency. From each of these choking grooves the aforementioned further grooves comprise two further straight grooves which extend at right angles to the choking grooves to points on or just outside the waveguide aperture. In a preferred construction, the inner edges of these further grooves are spaced apart slightly greater than the length of the longer side of the waveguide so that the inner edges of these further grooves extend from the choking grooves to points lying just outside the narrow edges of the waveguide aperture. Very conveniently the further grooves are made continuous to extend from one choking groove to the other. This is not essential, however, although it may be more convenient for manufacture, and the further grooves may each be terminated adjacent the nearest corner of the waveguide aperture if desired. These further grooves may extend beyond the choking grooves as this may in some case be more convenient for manufacturing and likewise the choking grooves may, if desired, extend beyond said further grooves.

For a square section waveguide, such as may be used for propagating signals with two orthogonal planes of polarization, four choking grooves may be arranged with their inner faces, straight and parallel to the respective faces of the waveguide and said further grooves arranged to extend inwardly from the choking grooves towards the waveguide aperture at right angles to the choking grooves. Preferably the choking grooves have lengths slightly greater than the length of the side of the waveguide aperture and, at each end of said choking grooves, said further grooves may be arranged to extend inwardly at right angles to said choking grooves, two of said further grooves meeting near each of the corners of the waveguide aperture and terminating at the meeting points. It will be appreciated that, in defining the width of the leakage transmission path between an edge of the waveguide aperture and a choking groove, the critical dimensions are to the inner edges of said further grooves; the shape of the outer edges of the choking grooves and of said further grooves is not critical. In an arrangement such as has just been described for a square section waveguide, the choking grooves and said further grooves may be parallel sided narrow grooves a quarter wavelength deep. In some cases, however it may be more convenient to have the outer edges of the choking grooves and said further grooves defined by a cylinder about the axis of the waveguide, as for example when the outer edges of these grooves are formed by a separate cylindrical element surrounding a suitably shaped flange on a waveguide; in this case, the inner edges of all the grooves are straight but the grooves extend outwardly from the waveguide aperture as far as the cylindrical outer element.

For a circular waveguide or a coaxial line, there may be provided a circular choking groove spaced a quarter wavelength away from the edge of the waveguide aperture or from the outer of the coaxial line. The aforesaid further grooves in this case may be arranged as a number of grooves extending radially inwardly from the choking groove towards the aforesaid aperture or outer of the coaxial line so as to break up the angular gap into sectors having arcuate dimensions of less than half a wavelength.

It will be appreciated that in all the arrangements described above, although it has been more convenient to envisage the choking grooves and said further grooves as being formed in radially extending flanges in the waveguide apertures, the surfaces around the waveguide aperture defining the narrow gap through which the leakage occurs may be folded and may, for example, be arranged partly to extend axially of the waveguide. Likewise the choking grooves and said further grooves may be folded if more convenient.

The form of waveguide choking coupling as described above has particular application to waveguide switches of the kind having a stator with a number of ports leading to separate waveguide sections and having a rotor containing one or more waveguide sections which can be positioned to connect pairs of ports in the stator. In such an arrangement there must necessarily, for mechanical reasons, be a gap between the rotor and a stator and it is generally desirable to minimize leakage through this gap. Very conveniently choking grooves and further grooves as described above are formed on the cylindrical surface of the rotor around ports in that surface of the rotor, which ports are aligned with ports on a cylindrical surface of the stator. For a switch employing rectangular waveguide sections, very conveniently the waveguides are arranged with their longer sides parallel to the axis of rotation and the stator is formed with a number of ports in its cylindrical surface. Grooves cut around these ports are spaced away from ports as described above. In the arrangement in which the longer side of the waveguide is parallel to the rotor axis, the choking grooves will be cut parallel to the rotor axis and spaced arcuately away from the longer sides of the waveguide a distance of the order of a quarter wavelength, whilst the further grooves may conveniently be two continuous grooves spaced apart axially extending circumferentially around the rotor closely adjacent the narrow edges of the waveguide ports.

In the following description reference will be made to the accompanying drawings in which:

FIGURES 1 to 7 are end views of waveguide terminations;

FIGURE 8 is a longitudinal section through a waveguide coupling embodying the termination of FIGURE 1;

FIGURE 9 is a plan view of a waveguide switch;

FIGURE 10 is a section along the line 10—10 of FIGURE 9;

FIGURE 11 is a section along the line 11—11 of FIGURE 10;

FIGURE 12 is a section through part of the switch along the line 12—12 of FIGURE 9 illustrating how the rotor is located axially; and FIGURE 13 is a section normal to the axis, through the rotor of another waveguide switch.

Referring to FIGURE 1 there is shown an end view of a rectangular waveguide. The waveguide aperture is illustrated at 10 and is surrounded by a flange 11. The waveguide is arranged for propagating signals in an $H_{01}$ mode, that is to say the electric vector is normal to the broad face of the waveguide. As shown in FIGURE 8, the flange 11 would about against a flange 111 of a similar waveguide 110 but, as is well known, there may be leakage through the inevitable gap between the two flanges, which gap is deliberately enlarged in FIGURE 8, and, to minimize this leakage, there are provided two choking grooves 12, 13 which are formed in the flange 11 parallel to the broad faces of the waveguide aperture 10. The inner edges of these choking grooves 12, 13 are spaced the order of a quarter wavelength at the operating frequency from the nearer edges of the waveguide aperture 10. The grooves 12, 13 are preferably made a quarter wavelength deep. There are also provided two further grooves 14, 15 at right angles to the choking grooves 12, 13 each of the grooves 14, 15 extending from one choking groove to the other and passing close to the narrow face of the waveguide aperture 10. The further grooves 14, 15 are also preferably a quarter wavelength deep. The depth and the width of the choking grooves and further grooves is not critical, however, although it should be greater than the gap between the flanges and it should not be equal to a half wavelength at the frequency of operation. The further grooves 14, 15 form side boundaries for the leakage transmission path which extend through the gap between the flanges from the broad faces of the waveguide aperture outwardly to the choking grooves 12, 13. These side boundaries ensure that the leakage signals pass only through this transmission path in a mode similar to the TEM mode in a parallel plate transmission line. So long as the width of the leakage transmission path is less than one wavelength the higher order symmetrical modes (similar to $H_{02}$ and higher modes in a parallel plate transmission line) are evanescent. The choking grooves 12, 13 thus coincide substantially with the phase front and the arrangement thus gives a considerable reduction in the leakage compared with the use of a simple pair of parallel choking grooves without the further side grooves defining the side boundaries.

A modification of the arrangement of FIGURE 1 is illustrated in FIGURE 2 in which a rectangular waveguide 20 has an end flange 21. In FIGURE 2, however, choking grooves 22, 23, which are a quarter wavelength deep and a quarter wavelength away from the edges of the aperture 20, are arranged to extend beyond the further grooves 24, 25 and likewise these further grooves 24, 25 extend beyond the choking grooves. Such an arrangement may be more convenient for manufacture in some cases since all the grooves may extend the full width of the flange.

FIGURE 3 illustrates a further modification of the arrangement of FIGURE 1 in which there is a waveguide aperture 30, the waveguide being terminated by an end flange 31 and in which choking grooves 32, 33 are provided similar to the grooves 12, 13 of FIGURE 1. It is not essential, however, that the further grooves defining the side boundaries of the leakage path through the gap should extend the whole distance between the two choking grooves and, as shown in FIGURE 3, these further grooves 34 to 37 extend from the ends of the choking grooves 32, 33 at right angles thereto to points at or very near the corners of the waveguide aperture 30. The grooves 34 to 37 still define the side boundaries to the leakage transmission path as in the arrangement of FIGURE 1 and the system thus operates in a similar manner. The grooves 34, 35 need not be spaced apart the full width of the waveguide aperture and may extend from the choking grooves to points near or on the longer sides of the waveguide aperture near the corner of the aperture.

FIGURE 4 illustrates a further modification of the arrangement of FIGURE 1 in which a rectangular waveguide having an aperture 40 is terminated with an end flange 41 and has choking grooves 42, 43 in the end flange similar to the grooves 12, 13 of FIGURE 1. There are also further grooves 44, 45 similar to the grooves 14, 15 of FIGURE 1. The outer boundaries of the further grooves do not greatly affect the operation of the system and in some cases it may be convenient to provide as shown in FIGURE 4 grooves 46, 47 extending outwardly from the grooves 44, 45 through the flange 41.

FIGURE 5 illustrates a square section waveguide having an aperture 50 surrounded by an end flange 51. This square section waveguide may be used typically for the propagating signals with two orthogonal planes of polarisation. In this construction there are provided four choking grooves 52, 53, 54 and 55 which are straight and parallel to the respective sides of the waveguide aperture and each spaced a quarter wavelength at the operating frequency from the adjacent side of the aperture. The grooves 52 to 55 are a quarter wavelength deep and, in the construction illustrated, each has a length slightly greater than the width of one of the faces of the waveguide aperture. Further grooves such as 56, 57 are provided extending inwardly from each end of the choking grooves at right angles thereto to a point near the corner of the waveguide aperture where these further grooves meet. The further grooves 56, 57 are also a quarter wavelength deep and it will be seen that these further grooves provide the side boundaries for the leakage transmission paths to each of the choking grooves.

It is not necessary that the grooves 52–55 should be longer than the side of the waveguide aperture; provided they are approximately equal to this length the further grooves 56, 57 may meet or may extend to points at or near the corners of the waveguide aperture to provide the required side boundaries for the leakage transmission path.

The form of the outer edges of the choking grooves and further grooves in FIGURE 5 is not critical and, instead of having narrow grooves as shown in FIGURE 5, it may be more convenient to have, as shown in FIGURE 6, a square waveguide aperture 60 surrounded by a flange 61 which is shaped to form the inner edges of choking grooves 62 and the further grooves 63 and to form the outer edges of these grooves by a separate cylindrical element 64 coaxial with the waveguide axis and surrounding the flange 61 on the waveguide. The inner edges of the grooves 62, 63 are straight but the grooves extend outwardly from these inner edges as far as the cylindrical outer element 64. The grooves, as before, are preferably a quarter wavelength deep and the choking grooves have their inner edges a quarter wavelength from the waveguide aperture.

In the arrangement of FIGURE 6, for convenience of construction it may be preferred to make the inner edges of the choking grooves 62 of arcuate shape, the arcs being circular arcs centred on the axis of the waveguide. This may facilitate construction whilst still providing satisfactory choking.

FIGURE 7 shows a circular waveguide having an aperture 70 for transmitting signals in an $E_{01}$ mode. In an end flange 71 of the waveguide there is provided a circular choking groove 72 with the inner edge spaced a quarter wavelength away from the edge of the waveguide aperture and concentric therewith. Further grooves 73 to 76 extend radially inwardly from the choking grooves towards the waveguide aperture. Four such radial grooves evenly spaced around the waveguide axis are illustrated in FIGURE 7. By providing a number of such evenly spaced grooves the leakage transmission path may be broken up into sectors having arcuate dimensions of less than half a wavelength so ensuring evanescence of undesired higher order modes.

The arrangement of FIGURE 7 may be used also for a coaxial line.

In any of the waveguide couplings described with reference to FIGURES 1 to 8, the choking grooves and/or the further grooves need not necessarily extend parallel to the axis of the waveguide but the flange surfaces and the grooves may be folded, for example to make the grooves extend radially. The surfaces of the flanges outside the choking grooves and further grooves may be in contact or may be non-contacting.

In the arrangements of FIGURES 1 to 8, the longer sides of the rectangular waveguides and the sides of the square waveguide would generally be less than one wavelength long so that the grooves defining the side boundaries of the leakage path would be less than one wavelength apart. If, for any reasons, the distance between the main side grooves should be greater than one wavelength wide, further auxiliary grooves may be provided between the side grooves and extending from the edge of the waveguide at right angles outwardly to the choking grooves to break up the leakage transmission path into sections less than one wavelength wide or, where there is any significant coupling into asymmetrical modes, into sections less than half a wavelength wide. Depending on the current distribution, these auxiliary grooves may have to be made smaller in width or depth than the main side grooves.

The forms of waveguide coupling described above with reference to FIGURES 1 to 8 find particular application in rotary waveguide switches and such a switch is illustrated in FIGURES 9 to 11. In the switch illustrated there is a stator 80 having four rectangular ports 81 to 84 for connection to external waveguide systems. The stator has a cylindrical inner surface within which is a rotor 85 formed with two waveguide transmission paths 86, 87 arranged for connecting adjacent pairs of the ports 81 to 84 together. By turning the rotor, any pair of adjacent ports in the stator may be connected together by one or other of the two waveguides 86, 87 through the rotor. The waveguides 86, 87 and the ports 81–84 are arranged with their broad faces parallel to the axis of the rotor and their shorter faces in planes normal to the axis of the rotor. Although a four-port switch is illustrated it will readily be appreciated that other constructions may be employed and there might, for example, be only three ports in a stator and a single passage in the switch enabling any pair of selected ports to be connected together.

The stator 80 is formed as a hollow drum with an integral lower end and is closed, after the rotor has been assembled in the stator, by a top plate 88 secured by screws 89. A plate 90 is secured to the top end of the rotor by screws 91, the plate 90 having a transverse rib 92 forming an operating member by which the rotor is turned. In this rib 92 is located a spring 93 urging a ball 94 onto an annular member 95 on the top surface of the top plate 88, this member 95 being dimpled at four points so that the ball 94 locates the rotor in each of the four required switch positions.

In such a rotary waveguide switch there is inevitably a small gap between the rotor and the stator; this gap permits leakage of signals and hence allows unwanted coupling between the ports of the stator. To minimise this coupling there are provided, in the switch illustrated, choking grooves 96, 97, 98, 99 formed in the rotor and extending the full length of the rotor between the bottom end of the stator assembly and the top cover plate 88 of the stator assembly. The grooves 96, 97 are diametrically opposite one another and are between the two transmission paths 86, 87. These grooves are made a quarter wavelength deep at the operating frequency and their width is such that their inner edges are spaced a quarter wavelength around the arcuate outer surface of the rotor (i.e. along the leakage transmission path) from the adjacent ends of the waveguide sections 86, 87. In the particular construction shown the grooves 98, 99 ensure effective electrical contact between the rotor and stator and also are required to reduce leakage around the rotor between the rotor and the stator. The grooves 98, 99 ensure effective electrical contact between the rotor and the stator and also serve to prevent leakage transmission around alternative paths between the two ends of the required paths through the rotor. In the particular switch illustrated the grooves 98, 99 are made a quarter wavelength wide. In some switches, instead of providing single grooves 96–99, it may be preferred to provide two or more separate parallel grooves as shown in FIGURE 13 which is a section (to a smaller scale) through an alternative construction of rotor. To give increased discrimination, additional circumferential grooves may be provided; these may or may not intersect the choking grooves.

To define side boundaries for the leakage transmission paths, circumferential grooves 100, 101 are formed in the rotor closely adjacent the narrow sides of the apertures defined by the ends of the waveguide sections 86, 87 through the rotor. These circumferential grooves 100, 101, which are a quarter wavelength deep, extend around the whole periphery of the rotor intersecting the aforementioned choking grooves 96, 97 and the grooves 98, 99 thereby forming side boundaries for the leakage transmission paths and so substantially reducing the leakage compared with an arrangement not having such side boundaries.

The grooves 100, 101 may in some cases be constituted by suitable gaps or recesses between the ends of the rotor and the stator. Although all the grooves 96–99 and 100–101 have been described as being formed in the rotor, they might be formed alternatively in the stator or the grooves 96–99 might be in the rotor and the grooves 100, 101 in the stator.

I claim:

1. A coupling between two waveguide sections wherein said sections have surfaces extending outwardly from the waveguide apertures, the two surfaces being adjacent to one another, said surfaces having at least one choking groove in at least one surface, said choking grooving extending parallel to the adjacent edge of the waveguide aperture to block leakage of radio frequency signals propagated through said narrow gap, and wherein further grooves are provided in at least one of said surfaces extending from points adjacent the waveguide aperture to intersect said choking groove at right angles dividing the annular region around the waveguide apertures into a plurality of separate leakage transmission paths of which said further grooves form side boundaries.

2. A coupling between two waveguide sections, wherein said sections have surfaces extending outwardly from the waveguide apertures, the two surfaces being adjacent to one another with a narrow gap, said surfaces having at least one choking groove in at least one surface to form a choking system, said choking groove being spaced a quarter wavelength at the operational frequency from the edge of the waveguide aperture and said surfaces having further grooves extending from a point close to the waveguide aperture to intersect said choking groove at right angles to form side boundaries for the region forming the leakage path between the waveguide aperture and the choking groove.

3. A coupling between two waveguide sections, wherein said sections have surfaces extending outwardly from the waveguide apertures, the two surfaces being adjacent to one another with a narrow gap, said surfaces having at least one choking groove in at least one surface to form a choking system, said choking groove being spaced a quarter wavelength at the operational frequency from the edge of the waveguide aperture and said surfaces having recesses with inner edges extending from a point close to the waveguide aperture to intersect said choking groove at right angles to form side boundaries for the region forming the leakage path between the waveguide aperture and the choking groove.

4. A coupling between two rectangular waveguides arranged for transmitting signals in an $H_{01}$ mode, wherein said waveguide sections have surfaces extending outwardly from the waveguide apertures, one of said surfaces having two choking grooves, one on each side of the waveguide aperture, which choking grooves are parallel to the longer edges of the waveguide aperture and having further grooves extending from points near the corners of the waveguide apertures in directions parallel to the narrow edges of the waveguide aperture to intersect said two choking grooves at right angles to form side boundaries for the regions forming the leakage paths between the longer edges of the waveguide aperture and said two choking grooves.

5. A waveguide coupling as claimed in claim 4 wherein the choking grooves are spaced away from the respective sides of the waveguide aperture by a quarter wavelength at the operating frequency.

6. A waveguide coupling as claimed in claim 4 wherein the inner edges of the further grooves are spaced apart slightly greater than the longer side of the waveguide aperture and wherein these further grooves are made continuous to extend from one choking groove to the other.

7. A waveguide coupling as claimed in claim 4 wherein, between said further grooves, there are provided additional grooves extending from the choking grooves towards the waveguide aperture and terminating at or near the waveguide apertures.

8. A coupling between two square section waveguides, wherein the waveguides, at the ends to be coupled, have surfaces extending outwardly from the waveguide apertures, the two surfaces being adjacent to one another with a narrow gap, one of said surfaces having four choking grooves arranged with their inner edges straight and parallel to but spaced away from the four respective edges of the waveguide aperture, and said one surface furthermore having further grooves with two such further grooves extending outwardly from near each corner of the waveguide aperture in straight lines to join at right angles the two nearest choking grooves to form side boundaries for the regions constituting the leakage paths between the waveguide aperture and choking grooves.

9. A waveguide coupling as claimed in claim 8 wherein said choking grooves and said further grooves are parallel sided narrow grooves a quarter wavelength deep at the operating frequency.

10. A waveguide coupling as claimed in claim 8 wherein the outer edges of said choking grooves and said further grooves are defined by a cylinder about the axis of the waveguide.

11. A waveguide switch comprising a stator with an inner cylindrical surface and having ports in that surface leading to separate waveguide sections with their longer faces parallel to the axis of the stator and a cylindrical rotor within the stator, the rotor containing at least one waveguide section extending between ports in the cylindrical surface of the rotor, which rotor can be positioned with the waveguide section or sections coupling pairs of ports in the stator, wherein choking grooves are provided in one of said surfaces extending parallel to the axis of the rotor, which choking grooves are a quarter wavelength wide or deep at the operating frequency and are spaced a quarter wavelength away from the edges of aligned ports measured around the arcuate gap between the stator and the rotor through which unwanted leakage is to be minimized and wherein circumferential grooves a quarter wavelength wide or deep are provided around one of said surfaces closely adjacent the narrow faces of the ports and intersecting the choking grooves.

12. A coupling between two circular waveguides, wherein the waveguides, at the ends to be coupled, have surfaces extending outwardly from the waveguide apertures, the two surfaces being adjacent to one another with a narrow gap, one of said surfaces having a circular choking groove spaced a quarter wavelength at the operating frequency from the edge of the waveguide aperture and having at least three further grooves extending radially inwardly from the choking groove towards the waveguide aperture to divide the leakage path between the waveguide aperture and the choking groove into sectors forming separate paths with said further grooves as side boundaries.

13. A coupling between two co-axial lines each having an inner and an outer conductor wherein the two lines, at the ends to be coupled, have surfaces extending outwardly from the outer conductor, the two surfaces being adjacent to one another with a narrow gap, one of said surfaces having a circular choking groove spaced a quarter wavelength at the operating frequency from the inner edge of the aperture formed by said outer conductor and having at least three further grooves extending radially inwardly from the choking groove towards the said inner edge of the aperture formed by said outer conductor to divide the leakage path between this aperture and the choking groove into sectors forming separate paths with said further grooves as side boundaries.

14. A waveguide switch comprising a hollow stator having an inner cylindrical surface with a number of rectangular ports in said inner cylindrical surface leading to separate rectangular waveguides and a cylindrical rotor rotatably mounted for rotational movement in said stator, the rotor containing at least one waveguide section extending between rectangular ports in the cylindrical surface of the rotor and arranged so that said waveguide section in the rotor can be positioned to connect selected pairs of ports in the stator, one of said cylindrical surfaces being formed with choking grooves parallel to and spaced a quarter wavelength at the operational frequency from the longer edges of the rectangular ports and having further grooves extending from said choking grooves at right angles thereto to points near the corner of said rectangular ports, and wherein said ports are arranged with their longer sides parallel to the axis of the rotor with said further grooves formed as two circumferential grooves extending around said one cylindrical surface closely adjacent to the narrower sides of the ports to form side boundaries for the leakage transmission paths from all the ports and wherein said choking grooves extend in the axial direction of the rotor intersecting the two circumferential grooves.

15. A waveguide switch as claimed in claim 14 wherein said choking grooves and said further grooves are formed in the rotor.

References Cited in the file of this patent
UNITED STATES PATENTS

| | | |
|---|---|---|
| 2,476,621 | Okress | July 19, 1949 |
| 2,705,776 | Starr | Apr. 5, 1955 |
| 2,769,144 | Walters | Oct. 30, 1956 |
| 2,837,723 | Krantz | June 3, 1958 |